(12) United States Patent
Schulz

(10) Patent No.: US 7,713,064 B2
(45) Date of Patent: May 11, 2010

(54) PRACTICE MODEL

(75) Inventor: Peter Schulz, Nonnenhorn (DE)

(73) Assignee: Franz Sachs GmbH & Co. KG, Tettnang (DE)

( * ) Notice: Subject to any disclaimer, the term of this patent is extended or adjusted under 35 U.S.C. 154(b) by 195 days.

(21) Appl. No.: 12/074,838

(22) Filed: Mar. 6, 2008

(65) Prior Publication Data
US 2008/0227072 A1    Sep. 18, 2008

(30) Foreign Application Priority Data
Mar. 16, 2007    (DE) .................. 20 2007 003 879 U

(51) Int. Cl.
G09B 23/28    (2006.01)
(52) U.S. Cl. .................................... 434/263
(58) Field of Classification Search ................. 434/263, 434/264; 433/74, 213
See application file for complete search history.

(56) References Cited
U.S. PATENT DOCUMENTS

| | | | | |
|---|---|---|---|---|
| 1,948,059 A * | 2/1934 | Baugh | ....................... | 434/263 |
| 2,539,278 A * | 1/1951 | Schwehr et al. | ............. | 434/263 |
| 3,458,936 A * | 8/1969 | Tuccillo et al. | ............. | 434/263 |
| 3,886,661 A * | 6/1975 | Neill | ........................... | 434/263 |
| 4,242,812 A * | 1/1981 | Randoll et al. | ............. | 434/263 |
| 4,902,232 A * | 2/1990 | Neustadter | ................... | 434/263 |
| 5,030,102 A * | 7/1991 | Lang | .......................... | 434/263 |
| 5,232,370 A * | 8/1993 | Hoye | .......................... | 434/263 |
| 5,320,529 A * | 6/1994 | Pompa | ........................ | 433/76 |
| 6,257,895 B1 * | 7/2001 | Oestreich | .................... | 434/274 |
| 6,524,105 B2 * | 2/2003 | Raffeiner | .................... | 433/213 |
| 6,988,894 B2 * | 1/2006 | Lee et al. | .................... | 434/263 |
| 2004/0191739 A1 | 9/2004 | Lee et al. | | |

FOREIGN PATENT DOCUMENTS

| | | |
|---|---|---|
| DE | 40 24 505 | 2/1992 |
| DE | 94 00 136.7 | 1/1995 |
| DE | 199 17 759 | 11/2000 |
| FR | 2 640 787 | 6/1990 |

\* cited by examiner

*Primary Examiner*—Kurt Fernstrom
(74) *Attorney, Agent, or Firm*—Pandiscio & Pandiscio

(57) ABSTRACT

A practice model for holding training teeth on which dentistry work can be performed includes a shell into which training teeth are insertable, and a carrier plate disposed in the shell and adapted to support the training teeth.

4 Claims, 3 Drawing Sheets

PRACTICE MODEL

BACKGROUND OF THE INVENTION (1) Field of the Invention

The present invention relates to a practice model for holding training teeth on which dentistry work can be performed, comprising a shell shaped like a set of teeth that is to be attached to an articulator or a phantom head, into which shell the exchangeable training teeth are inserted and which is covered by a base on the side facing the training teeth.

(2) Description of the Prior Art

In jaw models of this type, the training teeth are individually screwed onto the base of the shell. This means special shells are required for each different set of teeth, therefore when it comes to equipping training facilities it is not only the investment costs that are considerable but also a large number of practice models have to be kept in readiness in order to ensure that the work can progress without disruptions. Furthermore, it is very complicated to exchange a training tooth, because the screw connection between it and the base has to be unfastened and, in turn, a screw connection has to be made in order to hold a new training tooth. The practice models of prior art therefore cannot be used in an optimum way.

SUMMARY OF THE INVENTION

It is therefore the task of the present invention to design a practice model of the aforementioned kind in such a way that various training teeth can be inserted in it quickly and easily. Therefore, changing a set of teeth in a practice model should be possible in a straightforward manner without the need to keep a large number of shells in stock. Instead, it should be possible to lock the training teeth to be worked on in existing shells without difficulties, so that the particular training teeth to be worked on can be provided at short notice.

In accordance with the present invention, this is achieved in that a carrier plate shaped approximately like a horseshoe is provided in order to support the training teeth, is arranged in the shell and can be attached to the base of the shell, and that the carrier plate is provided with holding elements assigned to the training teeth for attaching the training teeth.

It is advantageous in this case for each carrier plate to be supported on at least three spacers preferably configured as spacer sleeves on the base of the shell, in which case the spacers should have different lengths adapted to the training teeth that are to be inserted in the carrier plate.

The holding elements provided on the carrier plate for attaching the training teeth can be provided in the form of screw channels or clamping webs, into each of which a clamping screw acting on a training tooth can be inserted, or as detent webs accommodating a ball head formed onto or attached to the training tooth or which engage into an undercut formed on the training tooth.

If a practice model is configured in accordance with the present invention, it is possible to insert different sets of teeth, for example sets of teeth with anatomically formed or very easy shaped forms of teeth roots incorporated, into a shell and to be secured then into the shell in a simple yet reliable manner. The training teeth merely need to be attached to the carrier plate that can be firmly connected to the base of the shell and the carrier plate can be provided with differently configured holding elements for this purpose. Also, the carrier plate can be arranged at different distances from the base of the shell, so that training teeth of different lengths can be fixed in one and the same carrier plate. When a set of teeth is changed, it is therefore only necessary to exchange the carrier plate if necessary in order to be able to provide a different kind of jaw model within a short time. With the help of the additional carrier plate that is provided, the number of practice models to be stocked is significantly reduced and also the holding elements attached to the models permit the training teeth to be changed rapidly.

BRIEF DESCRIPTION OF THE DRAWINGS

The drawing shows a sample embodiment of the practice model configured in accordance with the present invention, the details of which are explained below. In the drawing.

DESCRIPTION OF THE PREFERRED EMBODIMENT

Figure 1:
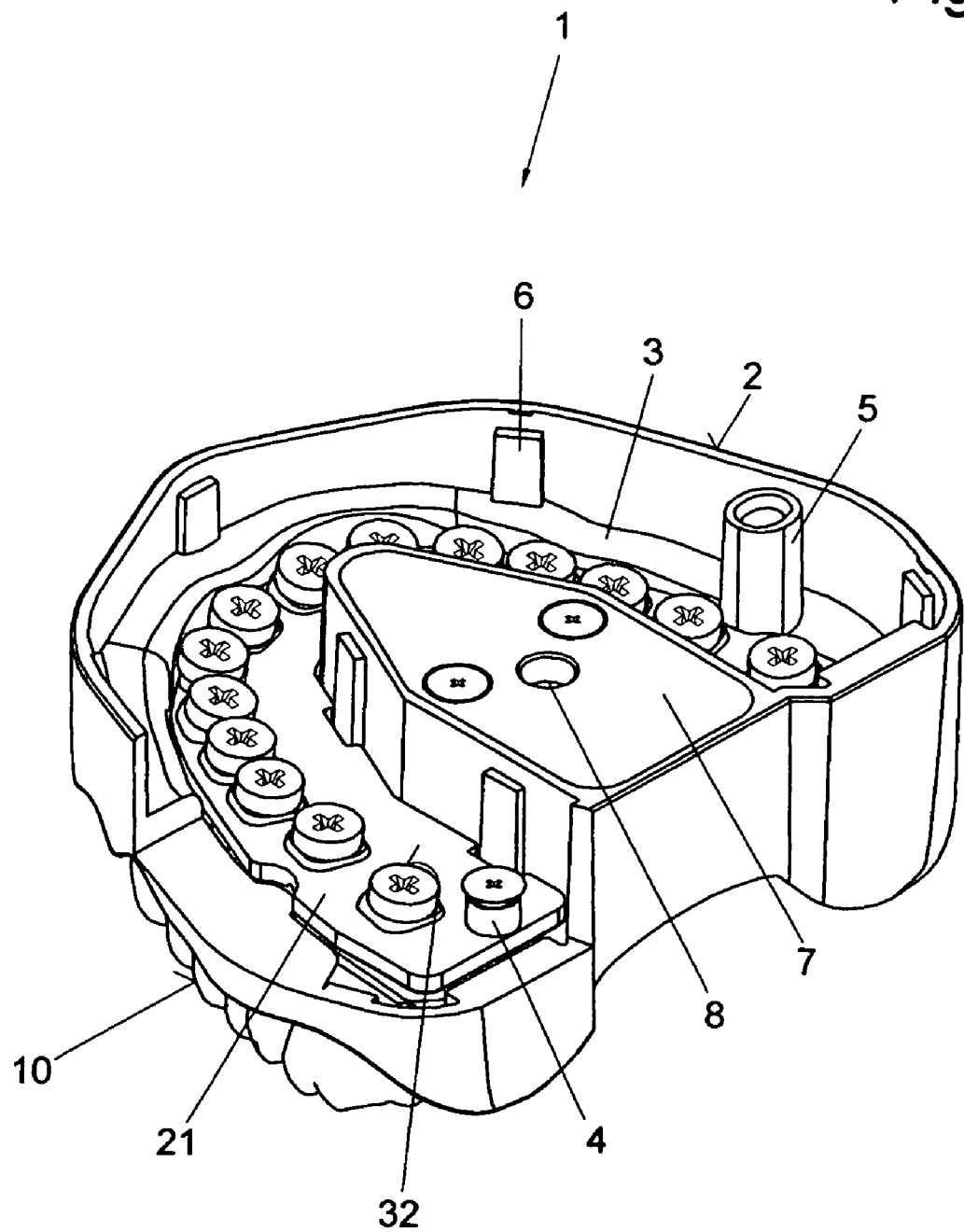
FIG. 1 shows the practice model with training teeth attached to a carrier plate, in a perspective view.

The practice model shown in FIG. 1 and identified with 1 is used for performing technical and medical dentistry work on training teeth 10 that are inserted in the practice model 1 and principally consists of a shell 2 in the shape of a set of teeth which is closed on the side facing the training teeth 10 by means of a base 3, and a carrier plate 21 in which the training teeth 10 are held. In order for the carrier plate 21 to be attached to the base 3, the carrier plate 21 is provided with projections 4 incorporating screw channels through which fastening screws 12 extend. Furthermore, the shell 2 is equipped with holders 5 for accommodating fixing pins and webs 6 on which a cover, that is also not illustrated, is supported. The practice model 1 is attached to a phantom head, for example, by means of a plate 7 with a hole 8 provided for this purpose.

Figure 2:
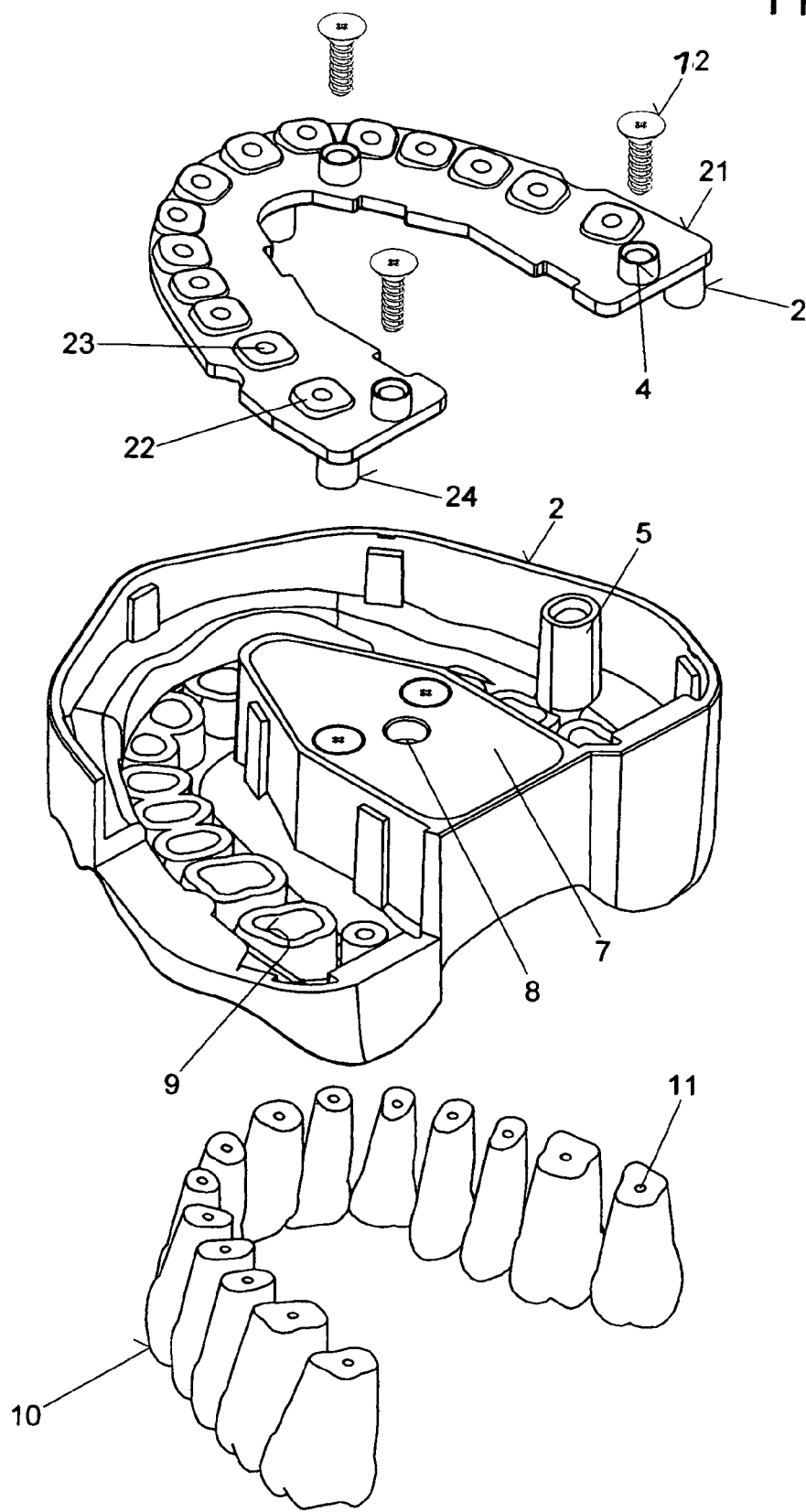
FIG. 2 shows the practice model in accordance with FIG. 1, in an exploded view, FIGS. 3 to 6 differently configured holding elements provided on the carrier plate of the practice model in accordance with FIG. 1 for locking the training teeth.
Figure 3:
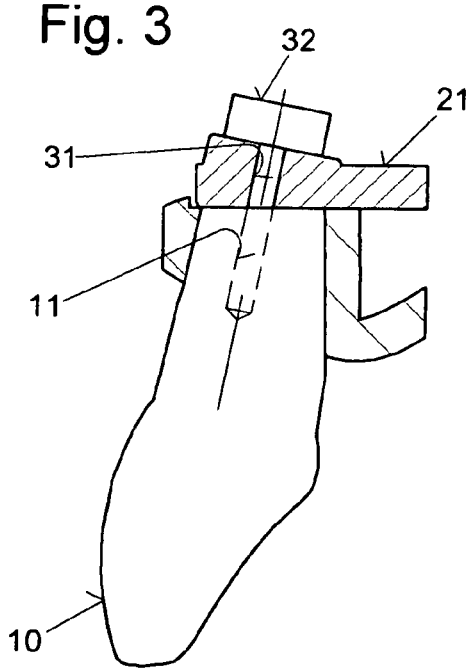

The training teeth 10, which can consist of plastic, metal or ceramic, are each supported on holders 22 formed into the carrier plate 21 and provided with through-holes 23, pass through tooth channels 9 provided in the base 3 and, in the sample embodiment shown in FIGS. 1, 2 and 3, are attached by means of clamping screws 32 as holding elements. For this purpose, screw channels 31 are worked into the carrier plate 21 and threaded holes 11 in the training teeth 10, so that the clamping screws 32 are supported on the carrier plate 21 and the training teeth 10 are secured attached to the carrier plate 21.

Figure 4:
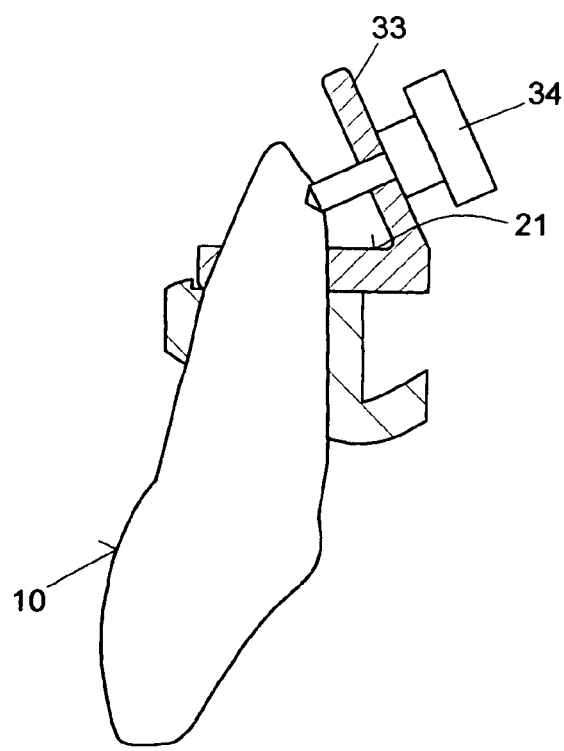

In the embodiment shown in FIG. 4, clamping webs 33 are formed onto the carrier plate 21 as holding elements in order to clamp the training teeth 10 in the carrier plate 21 and a clamping screw 34 is inserted into each of these clamping webs 33 that act at an angle on the training teeth 10. The training teeth 10 are therefore pressed against the carrier plate 21 by means of the clamping screws 34 and clamped against the carrier plate 21.

Figure 5:
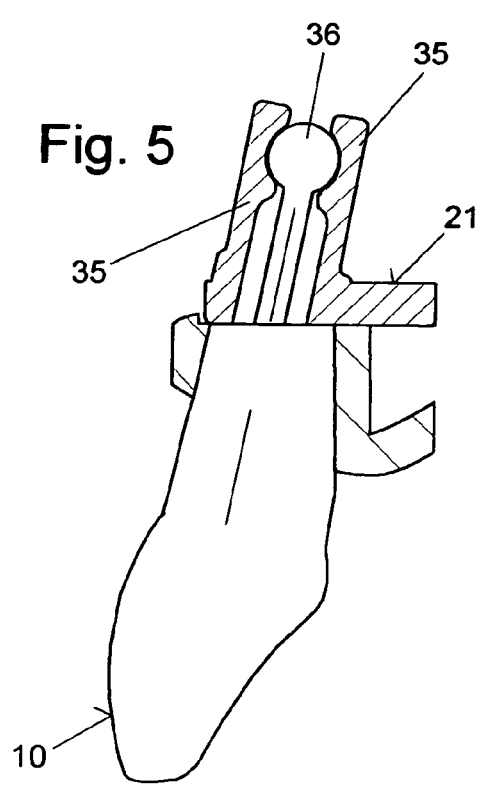
Figure 6:
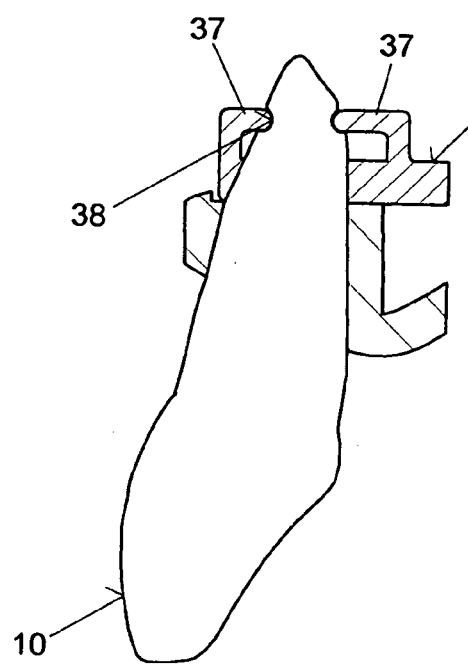

In the embodiments shown in FIGS. 5 and 6, the training teeth 10 are clamped by pairs of detent webs 35 or 37 arranged opposite one another as holding elements, with ball heads 36 formed on the training teeth 10 or undercuts 38 formed into the training teeth 10 engaging in between these pairs of detent webs 35 or 37.

Each of the holding elements formed on the carrier plate 21 permits the training teeth 10 to be exchanged rapidly, nevertheless secure support on the carrier plate 21 is guaranteed at all times.

In order to enable differently configured sets of teeth to be inserted into the shell 2 of the practice model 1, the carrier plate 21 can be provided with spacers 24 on the side facing the base 3, and the spacers 24 can be of different lengths depending on the size of the training teeth. In this way, the distance between the carrier plate 21 and the base 3 can be selected and adapted to the particular tooth shape.

The invention claimed is:

1. A practice model (1) for holding training teeth (10) on which dentistry work can be performed, the model comprising a shell (2) shaped like a set of teeth and adapted to be attached to an articulator or a phantom head, into which shell (2) the exchangeable training teeth (10) are insertable and which is covered by a base (3) on a side facing the training teeth (10), wherein a carrier plate (21) shaped generally like a horseshoe is provided in order to support the training teeth (10), and is arranged in the shell (2) and is attachable to the base (3) of the shell (2), and wherein the carrier plate (21) is provided with holding elements (31; 33; 35; 37) assigned to the training teeth (10) for attaching the training teeth (10).

2. The practice model in accordance with claim 1, wherein the carrier plate (21) is supported on at least three spacers (24) configured as sleeves on the base (3) of the shell (2).

3. The practice model in accordance with claim 2, wherein the spacers (24) are provided with selected lengths adapted to the training teeth (10) that are to be inserted in the carrier plate (21).

4. The practice model in accordance with claim 3, wherein the holding elements extend from the carrier plate (21) and are provided with a selected one of screw channels (31) and clamping webs (33), into each of which a clamping screw (32 or 34) acting on a training tooth (10) is insertable, and detent webs (35, 37) accommodating a ball head (36) extending from the training tooth (10), or which engage into an undercut (38) formed on the training tooth (10).

* * * * *